United States Patent
Feher et al.

(10) Patent No.: US 6,207,940 B1
(45) Date of Patent: Mar. 27, 2001

(54) MICROWAVE DE-ICING SYSTEM FOR AIRCRAFTS

(75) Inventors: Lambert Feher, Linkenheim-Hochstetten; Manfred Schnack, Ritterhude, both of (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/568,078

(22) Filed: May 10, 2000

Related U.S. Application Data

(63) Continuation-in-part of application No. PCT/EP98/06784, filed on Oct. 26, 1998.

(30) Foreign Application Priority Data

Nov. 13, 1997 (DE) .............................................. 197 50 198

(51) Int. Cl.⁷ .............................. H05B 6/80; B64D 15/12
(52) U.S. Cl. ........................ 219/679; 219/703; 219/716; 244/134 D
(58) Field of Search .................................... 219/678, 679, 219/703, 717, 715, 716, 761; 244/134 R, 134 D

(56) References Cited

U.S. PATENT DOCUMENTS

| | | | |
|---|---|---|---|
| 4,060,212 | 11/1977 | Magenheim | 244/134 D |
| 4,365,131 | * 12/1982 | Hansman, Jr. | 244/134 D |
| 5,061,836 | * 10/1991 | Martin | 219/703 |
| 5,615,849 | 4/1997 | Salisbury | 244/134 R |

* cited by examiner

Primary Examiner—Philip H. Leung
(74) Attorney, Agent, or Firm—Klaws & Bach

(57) ABSTRACT

In a de-icing system for preventing the formation of ice on, or for de-icing, icing-prone areas of an airplane, the icing-prone areas include dielectric composite structural materials, which are highly permeable for electromagnetic waves, and at least two microwave sources are provided and connected to microwave uncoupling areas disposed adjacent the icing-prone areas, and the microwave sources are interconnected by redundant switchable microwave guides permitting bridging of a microwave source in case of failure of such microwave source.

6 Claims, 2 Drawing Sheets ca. 40 m

MICROWAVE DE-ICING SYSTEM FOR AIRCRAFTS

This is a continuation-in-part application of international patent application PCT/EP98/06784 filed Oct. 26, 1998 and claiming the priority of German application 197 50 198.2 filed Nov. 13, 1997.

BACKGROUND OF THE INVENTION

The invention relates to a de-icing system for preventing, by microwave application, the formation of ice and for the de-icing areas of an airplane, which are prone to icing.

Because of meteorological conditions an airplane may become subject to icing during flight. The formation of ice particularly on the aerodynamically supporting, that is the lift generating, structures detrimentally affects the flying capability of an airplane by disturbing the laminar airflow. The airflow may even break off at lower speeds.

Particularly critical areas are the wing slats, which are the extendable sections at the front edges of the wings by which the wings profile can be lengthened for increasing the lift at low flying speeds. Also, the wings are such that the tail section including the rudder and the elevators, the outer wing parts, the engine inlet portion (fairings), the cockpit windows, the PAX doors and the freight doors may be affected.

Because these areas are important for the safety of an airplane, there are already various standard methods for de-icing procedures:

Warm air de-icing: Hot air is taken from the engines and is conducted to the endangered areas by way of a conduit system and valves, Liquid de-icing: A de-icing liquid is pumped by pumps from a storage tank by way of pipes and valves and distributed by a foraminous steel sheet, Electric de-icing: The surface areas prone to icing are provided with de-icing mats (electric heating mats), which generate electric resistance heat.

The first and the third of these methods require a relatively large amount of energy during flight, which energy is lost by thermal diffusion into the surrounding metallic wing material. The system of the second case is not available for an unlimited time since the amount of de-icing liquid is limited.

U.S. Pat. No. 5,615,849 discloses a microwave de-icing and anti-icing system for airplane wings, rotors and airfoil wings. Microwave energy is supplied to a hollow conductor in the leading edge of the airplane wing and is converted into thermal energy. A highly absorptive layer on the inner surface of the hollow conductor and a mirror/isolator are used to convert the microwave energy to thermal energy in the most efficient manner. The heat energy is then transferred from the hollow conductor to the surface, the rotor, or the wings, whereby the temperature of those areas is raised sufficiently above the freezing point to cause the ice to break up or to prevent icing in the first place.

Further requirements in the development of airplanes result from the need to handle increasing numbers of passengers, the travelling of longer distances, the reduction of fuel consumption and stricter emission controls. Flight safety, however, is always of greatest importance. As a result, among others, effective de-icing procedures and systems are of prime importance.

It is the object of the present invention to provide a de-icing system for areas of an airplane, which are prone to icing, whereby such areas are maintained free of ice or ice is removed from those areas in a short period in a reliable manner and with minimal energy consumption also when flying through problematic weather zones. New composite materials used in such designs must be suitable for aviation application.

SUMMARY OF THE INVENTION

In a de-icing system for preventing the formation of ice on, or for de-icing, icing-prone areas of an airplane, the icing-prone areas include dielectric composite structural materials, which are highly permeable for electromagnetic waves, and at least two microwave sources are provided and connected to microwave uncoupling areas disposed adjacent the icing-prone areas, and the microwave sources are interconnected by redundant switchable microwave guides permitting bridging of a microwave source in case of failure of such microwave source.

Di-electric compound materials, which are highly permeable in the frequency range utilized, are used for forming the icing-prone aerodynamic areas. These areas are addressed corresponding to their lift contributions by a microwave conduit system, wherein the microwaves provided by a microwave source are guided. The inner and center parts of the wing provide for most of the lift. The uncoupling arrangement or the antenna at each end of a wave guide system is optimally adapted to a particular de-icing area in order to uncouple microwave energy, by way of a microwave uncoupling structure. The microwave uncoupling structure is adapted to the particular area providing energy as needed and in accordance with the available power depending on the importance of the area for the lift of the airplane taking into consideration the instant meteorological situation. If several microwave sources are present, a system of redundant microwave conductor connections is provided wherein the microwave conductors bridge one or several failed microwave sources.

As compound materials CFC-/GFC structural materials may be used which are suitable as construction materials and are also microwave-conductive materials. Other di-electric compound materials are carbon fiber, glass-fiber and plastic materials, which may be used as structural component materials. The microwave source may be a gyrotron or a magnetron. Preferably, the microwave source provides monochromatic microwaves. For a large area and uniform HF application to the outer wings and other areas, which tend to form ice over a large area, so-called leakage wave antenna structures are provided.

A gyrotron is a microwave source, which is suitable for supplying a large amount of energy over a long period of time. It is also suitable however for pulsed operation. A magnetron is suitable for continuous operation with relatively low power output. It is also suitable for pulsed operation. Monochromatic operation is the simplest technical operating method in either case, and, in any case, is sufficient for supplying power for de-icing purposes.

As structure for applying microwave energy to large areas (wings) for de-icing purposes, a leak-wave antenna is preferably used.

Dielectric plastics have a substantially lower thermal conductivity than metals. They are almost transparent for electromagnetic waves in the range of 20 to 40 GHz, but they can still be heated by microwave energy.

Plastic materials are often used in aircraft as laminated structures. Since the material is extremely permeable to electromagnetic waves, any ice forming on the surface is instantly heated when subjected to microwaves. The required heating power is proportional to the ice mass. The design of the components can be optimized for optimum utilization of the power available from the power supplies.

The invention will be described below for a wing area on the basis of the accompanying drawings.

DESCRIPTION OF AN EMBODIMENT

Figure 1:
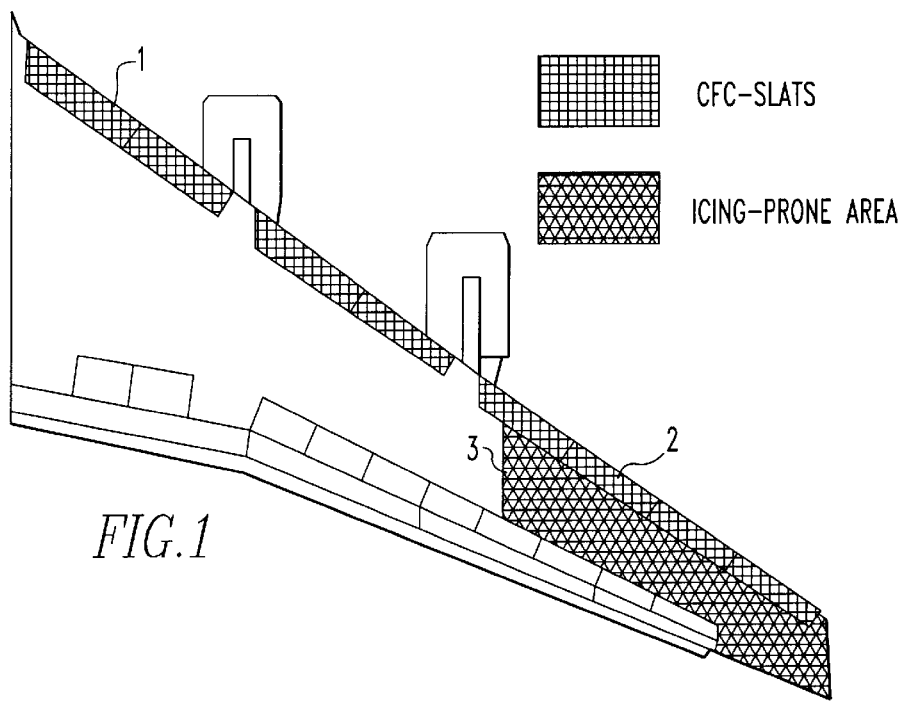
FIG. 1 shows a wing with CFC/GFC (carbon fiber composite/glass fiber composite) structures.
Figure 3:
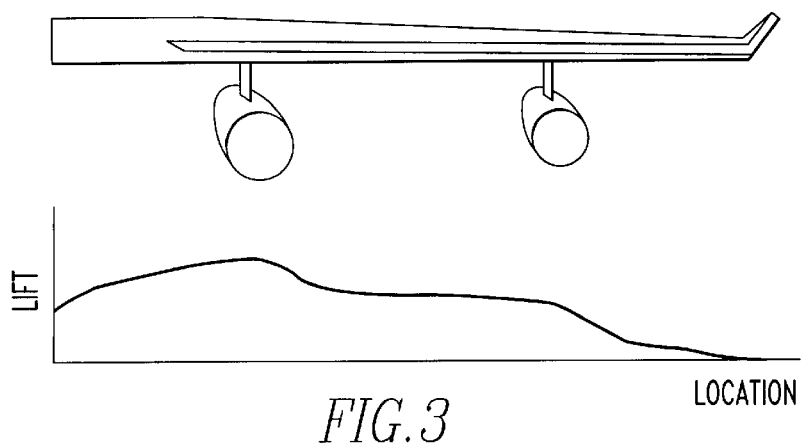
FIG. 3 shows the lift force distribution over the extension of a wing.

FIG. 3 shows a wing of an aircraft, wherein the lift distribution over the extent of the wing during take-off or landing is indicated. The outer center area of the wing must be capable of withstanding high bending moments, but also must have an optimal aerodynamic shape. Icing particularly in the center area of the wing and of the slats must be prevented to ensure maximum lift. As indicated in FIG. 1, the slats at the front of the wing consist of CFC and the large wing surface areas on the outer wing consist of CFC panels. In the rear of the wing, the curved flaps determine the wing profile.

Figure 2A:
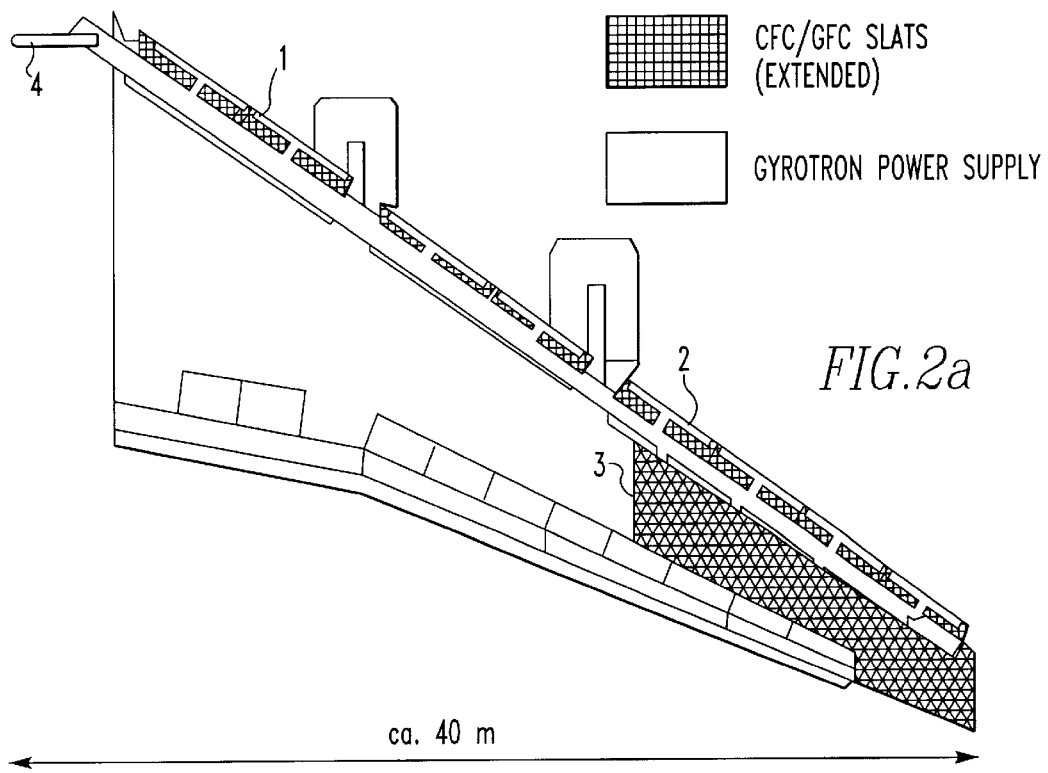
FIG. 2a shows a de-icing system on the wings of an airplane.
Figure 2B:
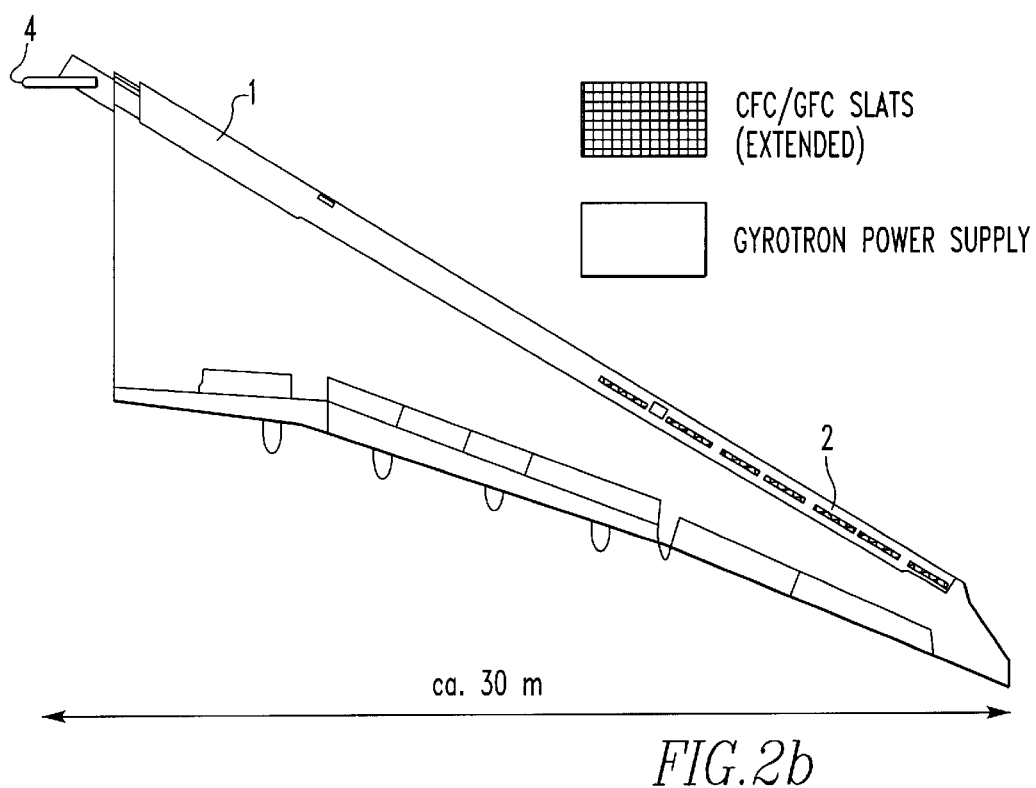
FIG. 2b shows a wing without outer de-icing system.

The microwave de-icing system, which is disposed within the wing is shown schematically in FIG. 2a. The icing prone areas consist of dielectric compound structural material suitable for airplane structures, which is highly permeable for electromagnetic waves of a frequency above 20 GHz. The deicing system includes, disposed in the airplane, at least two microwave sources (not shown). They operate at a frequency range, which is outside the frequencies utilized in aviation operations. A number of wave guide structures 4 extend from each microwave source to the various icing prone areas 1, 2 and 3, in which microwave uncoupling arrangements (antennas) which are adapted to the icing prone areas are disposed. The wave guide structures are connected to the uncoupling arrangements for coupling the microwaves into the dielectric compound materials. The wave guide structures are independently switchable for supplying microwave energy to the icing-prone areas in a controllable manner. The icing-prone areas include the main lift-generating inner and center wing areas. An independent wave guide system extends from the microwave sources to the icing-prone wing areas. The systems supplying these wing areas are energized early, that is, before other wave guide systems are activated for preventing condensation and the formation of droplets.

Each of the wave guide systems consists of high-mode flexible wave guide with a high-frequency uncoupling capability, that is controllable homogeneously for various sections. Sections or areas of icing prone surfaces can be heated uniformly as desired.

The microwave sources are interconnected by redundant switchable microwave guides so that, in case of a failure of any one of the microwave sources, it can be by-passed and power can be supplied by the remaining operative microwave sources to the microwave uncoupling structures. As microwave uncoupling structures for large icing prone areas preferably so-called leakage wave antenna structures are provided which facilitate distribution of the microwave energy over the large icing prone areas.

What is claimed is:

1. A de-icing system for preventing the formation of ice on, or for de-icing, icing-prone areas of an airplane having wings with inner, center, and outer wing sections, said icing-prone areas consisting of dielectric compound structural materials suitable for airplane structures, said di-electric compound material being highly permeable for electromagnetic waves of a frequency above 20 GHz, said de-icing system further comprising, disposed in said airplane, at least two microwave sources adapted to operate in a frequency range outside the frequencies utilized in aviation operations, a number of wave guide structures extending from each microwave source to the various icing prone areas, microwave uncoupling structures connected to said wave guide structures and being disposed adjacent said icing prone areas for coupling said microwaves into said di-electric compound materials, each of said wave guide structures being independently switchable for supplying microwave energy to said icing-prone areas in a controllable manner, said icing-prone areas including inner and center wing areas which are the main lift generating areas of said airplane to which an independent wave guide system extends from said microwave source and which are energized early, that is, before other wave guide systems are activated for preventing condensation and formation of droplets, each of said wave guide system consisting of high-mode flexible wave guides with a capability of uncoupling high-frequency microwave energy in a sectionally energy-constant, area-homogenous controllable manner providing for a uniform heating of any ice forming on the respective icing-prone surfaces, and said microwave sources being interconnected by redundant switchable microwave guides permitting by-passing a microwave source in case of failure of such microwave source.

2. A de-icing system according to claim 1, wherein said di-electric compound in said composite material is one of carbon fiber and glass fiber structural material.

3. A de-icing system according to claim 1, wherein said microwave source is a gyrotron.

4. A de-icing system according to claim 1, wherein said microwave source is a magnetron.

5. A de-icing system according to claim 1, wherein said microwave source delivers microwaves monochromatically.

6. A de-icing system according to claim 1, wherein, for a large area, uniform microwave application to the outer wing areas and other large icing-prone areas, a so-called leakage wave antenna structure is provided for distributing the microwave energy over said large icing-prone areas.

\* \* \* \* \*